(12) United States Patent
Kase

(10) Patent No.: US 7,993,010 B2
(45) Date of Patent: Aug. 9, 2011

(54) LIGHT SOURCE COMPARTMENT STORING LIGHT SOURCE UNIT AND PROJECTOR INCLUDING THE SAME LIGHT SOURCE COMPARTMENT

(75) Inventor: Toshifumi Kase, Fuchu (JP)

(73) Assignee: Casio Computer Co., Ltd., Tokyo (JP)

( * ) Notice: Subject to any disclaimer, the term of this patent is extended or adjusted under 35 U.S.C. 154(b) by 406 days.

(21) Appl. No.: 12/141,999

(22) Filed: Jun. 19, 2008

(65) Prior Publication Data

US 2008/0316437 A1 Dec. 25, 2008

(30) Foreign Application Priority Data

Jun. 21, 2007 (JP) ................................ 2007-163603

(51) Int. Cl.
*G03B 21/16* (2006.01)
*F21V 29/02* (2006.01)
(52) U.S. Cl. .......................................... 353/61; 362/373
(58) Field of Classification Search .................... 353/52, 353/57–67; 362/373
See application file for complete search history.

(56) References Cited

U.S. PATENT DOCUMENTS

| 7,393,109 B2 * | 7/2008 | Arboix ............................. 353/57 |
| 2008/0055563 A1 * | 3/2008 | Momose et al. ................ 353/61 |
| 2008/0316437 A1 * | 12/2008 | Kase ................................ 353/61 |
| 2009/0051829 A1 * | 2/2009 | Nagahata et al. ............. 348/789 |
| 2009/0135378 A1 * | 5/2009 | Lin et al. ......................... 353/61 |

FOREIGN PATENT DOCUMENTS

| JP | 2003-15223 A | 1/2003 |
| JP | 2003-215710 A | 7/2003 |
| JP | 2003-262921 A | 9/2003 |

OTHER PUBLICATIONS

Japanese Office Action dated May 21, 2009 (3 pages), and English translation thereof (4 pages), issued in counterpart Japanese Application Serial No. 2007-163603.

* cited by examiner

*Primary Examiner* — John R Lee
(74) *Attorney, Agent, or Firm* — Holtz, Holtz, Goodman & Chick, PC

(57) ABSTRACT

A protector is provided which can prevent the leakage of light from a light source lamp to the outside of the projector and which can discharge air that has cooled a light source unit to the outside of the projector with a small ventilation resistance. A light source compartment storing a light source unit according to the invention includes a light source storing section which is defined by partitioning walls which surround the light source unit, an air inlet port which is provided in part of the partitioning walls to let in air discharged from a cooling fan and a rotatable light shielding member having a plurality of vane portions on a rotational shaft thereof which is provided in an air outlet port formed in part of the partitioning walls to let out air.

15 Claims, 5 Drawing Sheets

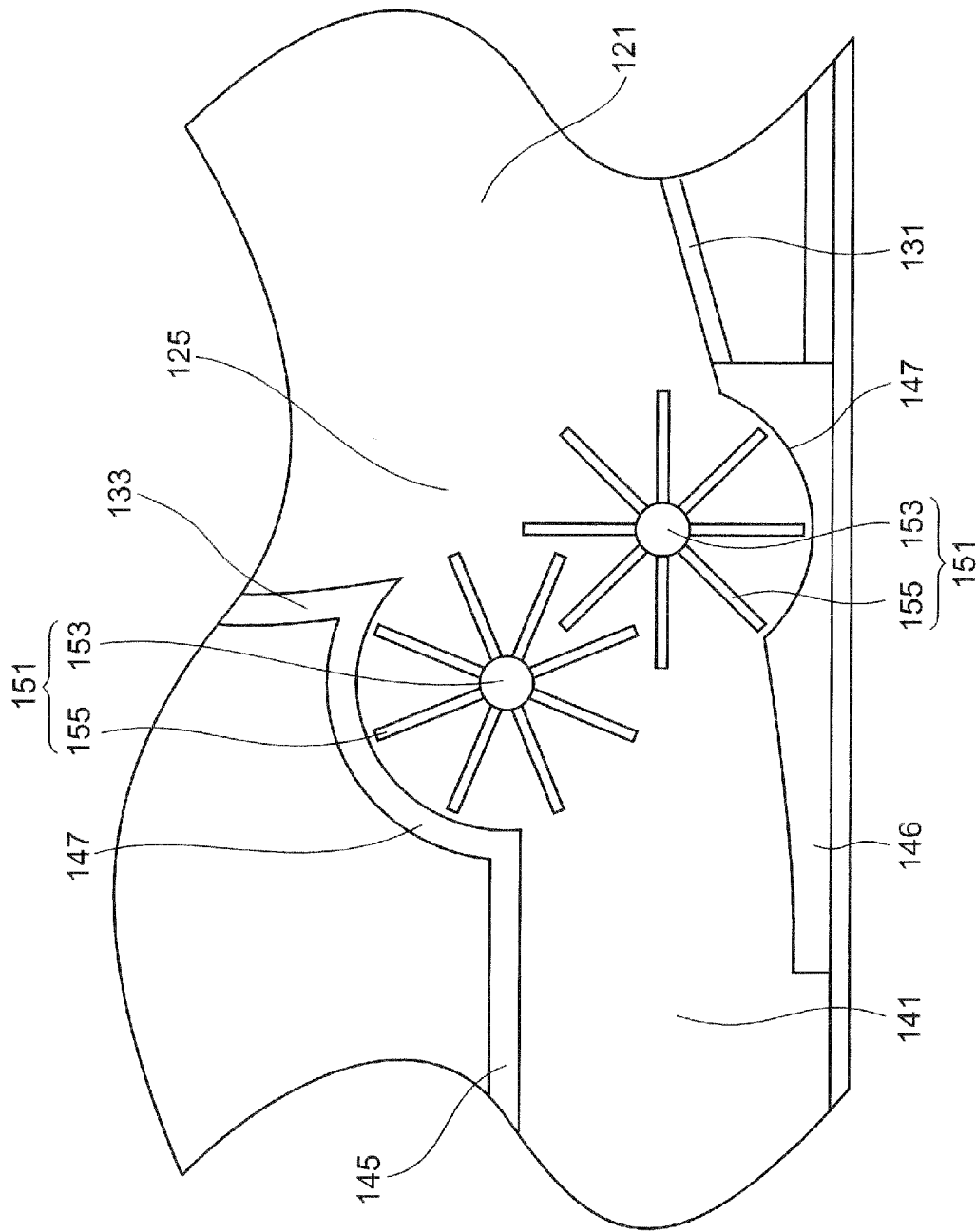

LIGHT SOURCE COMPARTMENT STORING LIGHT SOURCE UNIT AND PROJECTOR INCLUDING THE SAME LIGHT SOURCE COMPARTMENT

CROSS-REFERENCE TO RELATED APPLICATIONS

This application is based upon and claims the benefit of priority from the prior Japanese Patent Application No. 2007-163603, filed on Jun. 21, 2007; the entire contents of which are incorporated herein by reference.

BACKGROUND OF THE INVENTION

The present invention relates to a projector and more particularly to a light source compartment which stores a light source unit of a projector.

Currently, data projectors are used in many cases to project images displayed on a screen of a personal computer, images created by video signals and, furthermore, images by image data stored in a memory card on to a screen.

In many cases, the data projectors are constructed such that a light source unit which includes a small high-intensity discharge lamp such as a metal halide lamp or an extra-high pressure mercury lamp is used and light emitted from the light source unit is divided into the three primary colors by a color filter so as to be shone on to a liquid crystal display device or a display device referred to as a DMD (Digital Micromirror Device) by a light source-side optical system, so that the light passing through or reflected on the display device is projected on to a screen via a lens group referred to as a projection-side optical system which includes a zooming function.

Since the light source unit used in the data projector becomes high in temperature, a cooling fan is disposed within a housing of the projector to take outside air into the projector housing from the periphery of the projector housing for circulation therein, and the air heated to a high temperature is discharged to the outside again, whereby the temperature inside the projector housing is made to be reduced.

SUMMARY OF THE INVENTION

An aspect of the invention is to provide a light source compartment in which ventilation resistance is not increased and which can effectively screen off itself so that no light from a light source unit leaks to the outside and a projector including this light source compartment.

According to a first aspect of the invention, there is provided a light source compartment storing a light source unit, including a light source storing section which is defined by partitioning walls which surround the light source unit, an air inlet port which is provided in part of the partitioning walls for causing air discharged from a cooling fan to flow into the light source storing section, and a rotatable light shielding member which has a plurality of vane portions on a rotational shaft which is provided in an air outlet port which is defined in part of the partitioning walls to let out the air from the light source storing section.

According to a second aspect of the invention, there is provided a projector incorporating within a housing thereof a light source unit, a light source-side optical system, a display device, a projection-side optical system, a cooling fan and a projector control unit, the projector having air inlet holes and air outlet holes which are provided in the housing and a light shielding member which has a plurality of vane portions on a rotational shaft which is provided in an outlet flow path of the cooling fan which is connected to the air outlet holes.

BRIEF DESCRIPTION OF THE DRAWINGS

FIG. 5 is a diagram showing a main part of a light source compartment for use in another modified example of a projector according to the invention.

DESCRIPTION OF THE PREFERRED EMBODIMENT

Figure 1:
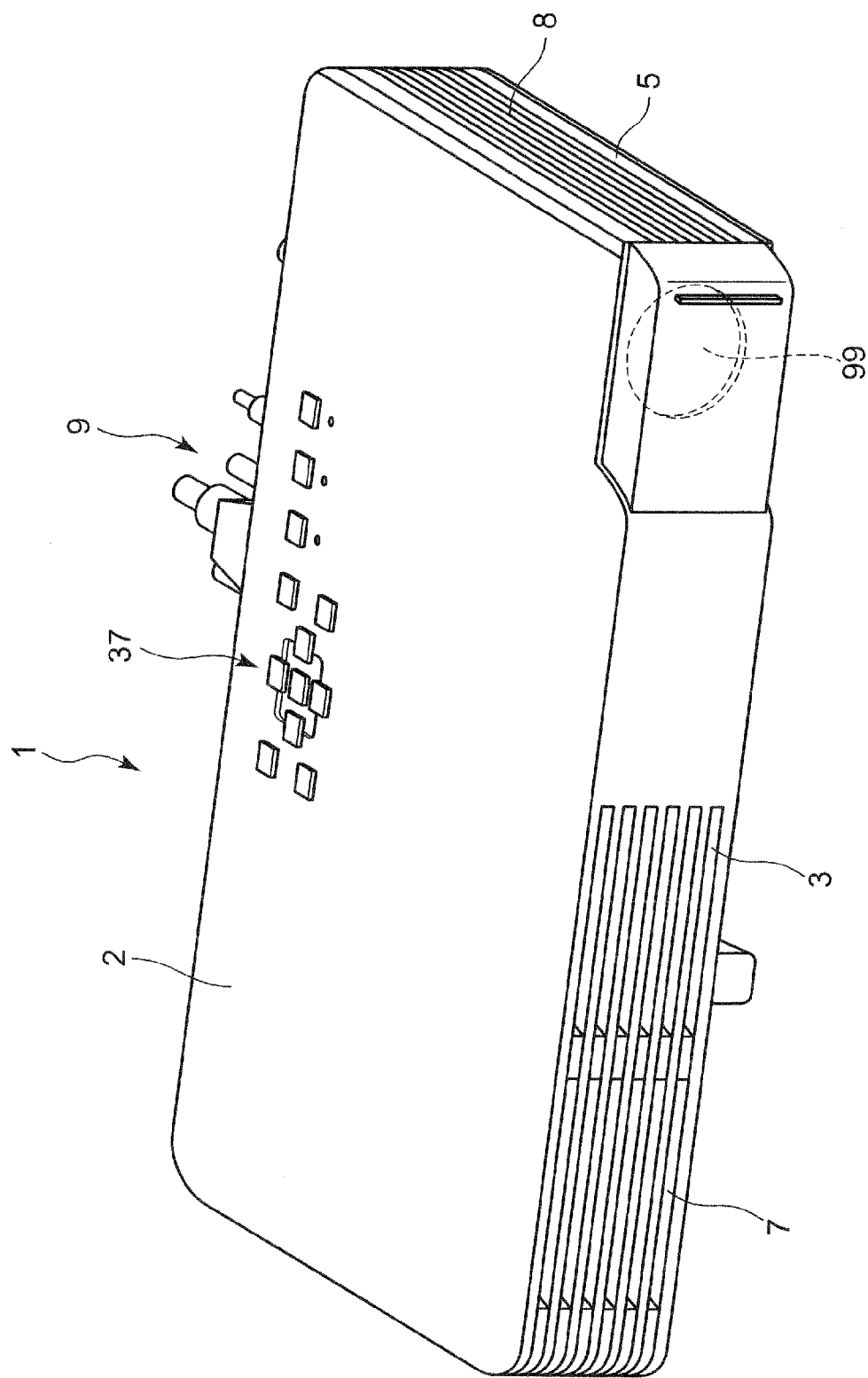
FIG. 1 is a front perspective view showing an embodiment of a projector according to the invention.

A projector 1 according to a best mode for carrying out the invention has a substantially rectangular parallelepiped projector housing which has a plurality of air inlet holes 8 in part of each of a right side plate 4, a left side plate 5 and a back plate and a plurality of air outlet holes 7 in a front plate 3, and furthermore, a projection port 99 is provided in the front plate 3. Disposed and stored in an interior of the projector housing are a light source unit 61, a light source-side optical system which is made up of a color wheel 71, a light guiding or light-smoothing unit 75 and a light source-side lens group 62, a display device 50, a projection-side optical system 90, a blower 110 which is a cooling fan, and a projector control unit.

In addition, in this projector 1, a light source storing section 121 is defined in the vicinity of the light source unit 61 by providing partitioning walls 131, 132, 133 in such a manner as to surround the light source unit 61, and a light source compartment 120 which includes the light source storing section 121 and an outlet flow path 141 which guides air discharged from the light source storing section 121 to the air outlet holes 7 is provided in the projector housing. The projector 1 has an air inlet port 123 in part of the partitioning walls 132, 133 which define the light source storing section 121 for causing air from the cooling fan to flow into the light source storing section 121 and a rotatable pinwheel member 151 (a light shielding member) having a plurality of vane portions 155 on a rotational shaft 153 which is provided in an air outlet port 125 formed in part of the partitioning walls 131, 133.

Furthermore, the light source compartment 120 is formed in such a manner that an air outlet port 125 side end portion of the partitioning wall 133 is connected to a flow path partitioning wall 145 which defines the outlet flow path 141 along which air discharged from the light source storing section 121 is guided to the air outlet holes 7 so as to cause the air outlet port 125 to communicate with the air outlet holes 7 via the outlet flow path 141, the rotational shaft 153 of the pinwheel member 151 is disposed in the vicinity of the flow path partitioning wall 145 so that the vane portions 155 of the pinwheel member 151 close the outlet flow path 141 in a position directly close to the air outlet port 125, and a curved portion 147 is formed in the flow path partitioning wall 145 in such a manner as to permit a rotational passage of the vane portions 155.

Hereinafter, an embodiment of the invention will be described based on the drawings. A projector 1 according to an embodiment of the invention is, as is shown in FIG. 1, formed into a substantially rectangular parallelepiped shape, and a plurality of air outlet holes 7 are formed in a front plate 3 which is a front side plate of a main body casing which is a projector housing and a projection port 99 is provided in the vicinity of a side end portion of the front plate 3.

In addition, a keys/indicators section 37 is formed on a top plate 2 which makes up the main body casing, and the keys/indicators section 37 is such as to include keys and indicators such as a power supply switch key, a power indicator which informs that a power supply is on or off, a lamp switch key for turning on a lamp of a light source unit, a lamp indicator for indicating that the lamp is turned on, and an overheat indicator for informing that the light source unit overheats.

Furthermore, on a back side of the main body casing thereof, the projector 1 includes various types of terminals 9 which include an input/output connectors section where a USB terminal and an image signal inputting D-SUB terminal, an S terminal, an RCA terminal and the like are provided, a power supply adaptor plug and an Ir reception unit for receiving control signals from a remote controller, and has in part air inlet holes 8 which are not shown in FIG. 1.

In addition, a plurality of air inlet holes 8 are formed in a right side plate 4 which is a side plate of the main body casing which is not shown in FIG. 1 and a left side plate 5 which is a side plate shown in FIG. 1.

Figure 2:
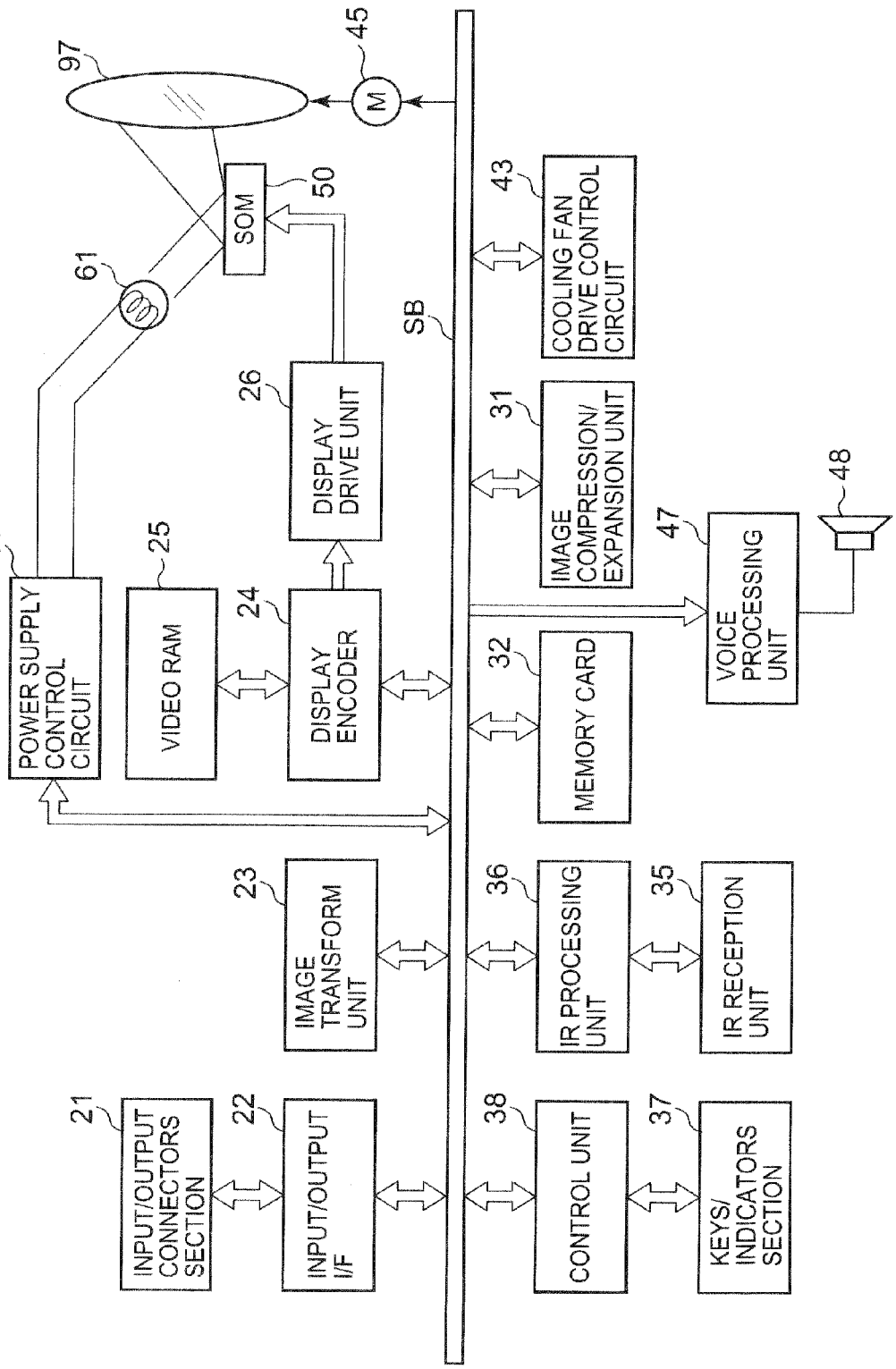
FIG. 2 is a control block diagram of the embodiment of the projector according to the invention.

Additionally, a control circuit of the projector control unit of the projector 1 has, as is shown in FIG. 2, a control unit 38, an input/output interface 22, an image transform unit 23, a display encoder 24, a display drive unit 26 and the like. Picture signals of various standards which are inputted from an input/output connectors section 21 are sent to the image transform unit 23 via the input/output interface 22 and a system bus (SB) and are transformed in the image transform unit 23 in such a way as to be integrated into a picture signal of a predetermined format which is suitable for display, and the picture signal so transformed is then sent to the display encoder 24.

This display encoder 24 deploys the picture signal so sent thereto on a video RAM 25 so as to be stored therein and thereafter generates a video signal from the contents stored in the video RAM 25 for output to the display drive unit 26.

The display drive unit 26 into which the video signal is inputted from the display encoder 24 drives a display device 50, which is a spatial optical modulator (SOM), at an appropriate frame rate in response to the picture signal sent thereto. Light from a light source unit 61 is made to be incident on the display device 50 via a light source-side optical system so as to form an optical image by reflected light from the display device 50, and the optical image so formed is then projected to be displayed on a screen, not shown, via a projection system lens group which constitutes a projection-side optical system. A movable lens group 97 of the projection system lens group is driven by a lens motor 45 for zooming adjustment or focusing adjustment.

In addition, an image compression/expansion unit 31 performs a recording operation in which a luminance signal and a color difference signal of the picture signal are data compressed through ADTC and Huffman coding so as to be written sequentially on a memory card 32 which is a detachable recording medium, and in a reproducing mode, the image compression/expansion unit 31 reads out image data recorded in the memory card 32 so as to expand individual image data which constitute a series of moving pictures one frame by one frame and sends the image data so expanded to the display encoder 24 via the image transform unit 23, so as to enable the display of moving pictures or the like based on the image data stored in the memory card 32.

The control unit 38 is such as to govern the control of operations of respective circuits in the projector 1 and is made up of a CPU, a ROM which fixedly stores operation programs for various types of settings, a RAM which is used as a work memory and the like.

In addition, operation signals of the keys/indicators section 37 which is made up of the main keys and indicators which are provided on the top plate 2 of the main body casing are sent directly to the control unit 38, and key operation signals from the remote controller are received by an Ir reception unit 35, and a code signal which is demodulated by an Ir processor unit 36 is then sent to the control unit 38.

Note that a voice processing unit 47 is connected to the control unit 38 via a system bus (SB), and the voice processing unit 47 includes a voice source circuit such as a PCM voice source so as to convert voice data into analog data and drive a speaker 48 to emit sound loudly therefrom in projection and reproduction modes.

The control unit 38 controls a power supply control circuit 41 and the like. When the lamp switch key is operated, the control unit 38 causes the power supply control circuit 41 to turn on a discharge lamp of the light source unit 61 and furthermore, causes a cooling fan drive control circuit 43 to perform temperature detections by a plurality of temperature sensors provided on the light source unit 61 so as to control the rotational speed of a blower 110 shown in FIG. 3 which constitutes a cooling fan. The control unit 38 also causes a timer to make the cooling fan continue to rotate even after the lamp of the light source unit 61 has been turned off so as to perform cooling down. Furthermore, depending upon the results of the temperature detections by the temperature sensors, the control unit 38 controls the light source unit to be stopped to switch off the power supply of the projector main body.

Figure 3:
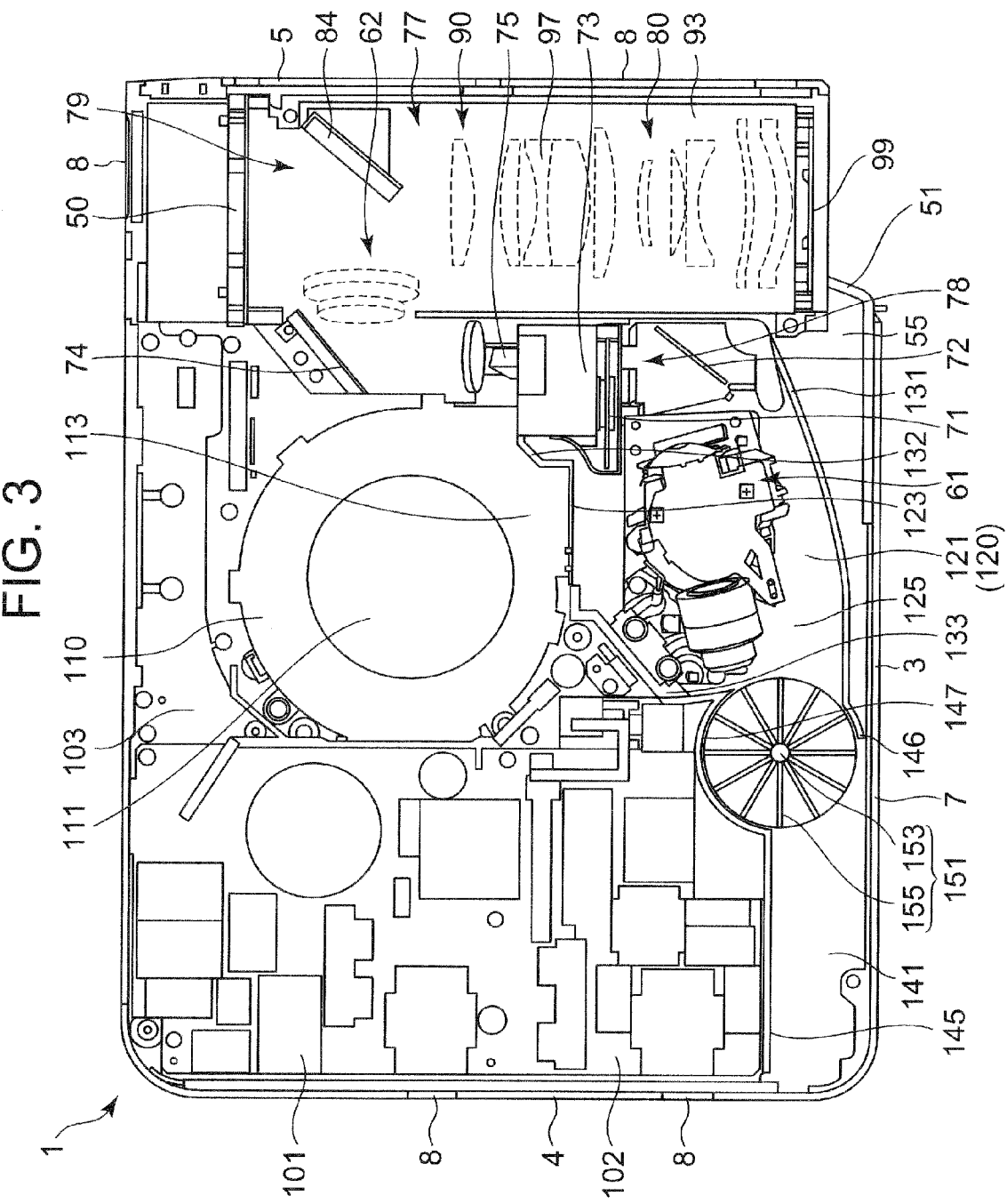
FIG. 3 is a plan view of the embodiment of the projector according to the invention with a top plate thereof removed.

As is shown in FIG. 3, in an interior construction of the projector 1, partitioning walls 131, 132, 133 are provided in such a manner as to surround the light source unit 61 so as to define a light source storing section 121, and a space is provided in the vicinity of the blower 110 between the second partitioning wall 132 and the third partitioning wall 133, so that an outlet port 113 of the blower 110, being of a sirocco fan type, which functions as the cooling fan is positioned in the space so provided, whereby air discharged from the cooling fan is made to flow into the light source storing section 121. In addition, a space is provided between the first partitioning wall 131 provided near the front plate 3 and the third partitioning wall 133 provided near the blower 110 so as to cause the space to function as an air outlet port 125, and this air outlet port 125 is made to communicate with the air outlet holes 7 in the front plate 3.

In addition, a pinwheel member 151 adapted to rotate by virtue of discharged air is disposed on an outside of the light source storing section 121 in the air outlet port 125 as a light shielding member, and an air outlet port 125 side end portion of the third partitioning wall 133 is connected to the right side plate 4 by a flow path partitioning wall 145, so as to ensure that cooling air from the air outlet port 125 is discharged from the air outlet holes 7 in the front plate 3 to the outside.

Additionally, this flow path partitioning wall 145 has an arc-shaped curved portion 147 which accommodates therein substantially a half the pinwheel member 151 on a light source storing portion 121 side thereof, and the rotational shaft 153 of the pinwheel member 151 is disposed in the vicinity of the flow path partitioning wall 145 in such a manner as that the rotational shaft 153 is provided in the center of the curved portion 147, a plurality of plate-shaped vane portions 155 being provided on the rotational shaft 153 in such a manner as to rotate freely about the rotational shaft 153.

An air outlet port 125 side of the first partitioning wall 131 is slightly curved to match a rotational radius of distal ends of the vane portions 155 of the pinwheel member 151 as a second flow path partitioning wall 146, and the second flow path partitioning wall 146 is positioned directly close to the distal ends of the vane portions 155 of the pinwheel member 151, so as to close an outlet flow path 141 which is defined by the flow path partitioning wall 145 and the second flow path partitioning wall 146 by the vane portions 155 so that no light leaks from the light source unit 61 stored in the light source storing section 121 even when the pinwheel member 151 rotates.

In this way, the light source compartment 120 is formed in which the light source storing section 121 which stores the light source unit 61 is defined by surrounding the light source unit 61 by the first partitioning wall 131, the second partitioning wall 132 and the third partitioning wall 133, the air inlet port 123 through which cooling air from the blower 110 is let into the light source storing section 121 and the air outlet port 125, including the pinwheel member 151, which discharges the air from the light source storing section 121 are provided in the light source storing section 121 and the air outlet port 125 is made to communicate with the air outlet holes 7 of the projector 1 by the outlet flow path 141, and an interior of the projector housing is divided into an inlet side space which excludes the light source compartment 120 and an outlet side space which extends from the light source compartment 120 to the air outlet holes 7.

In addition, stored together with the light source unit 61 in the light source storing section 121 of the light source compartment 120 is part of the light source-side optical system such as a first reflection mirror 72 which reflects light emitted from the light source unit 61 to a color wheel 71, the color wheel 71 which includes a color filter and the like, and an incident side end portion of a light guiding or light smoothing unit 75, which is adapted to convert light which has passed through the color filter into a light beam in which the intensity of light is uniformly distributed across the width of the beam, is made to pass through the second partitioning wall 132 so as to be positioned in an interior of the light source storing section 121.

In addition, disposed in the inlet side space are a power supply control circuit board 102 on which a power supply circuit block 101 including the power supply control circuit 41 is mounted, a main control circuit board 103 including the projector control unit, and an image generation block 79 and a projection-side block 80 of an optical system unit 77, which will be described later.

The blower 110 includes an inlet port 111 and an outlet port 113, and the outlet port 113 has a substantially square cross section and is connected to the partitioning walls 132, 133 of the light source storing section 121, whereby air in the inlet side space is let in from the inlet port 111, the air so let in is then let out from the outlet port 113 into the light source storing section 121 of the light source compartment 120, so as to cool the light source unit 61 and the like which are disposed in the light source storing section 121, and the air that has cooled the light source unit 61 and the like is finally let out from the air outlet holes 7 in the front plate to the outside.

The optical system unit 77 is made up of the image generation block 79 and the projection-side block 80, and the image generation block 79 incorporates mirrors and a group of lenses as the light source-side optical system. Specifically, the image generation block 79 includes a second reflection mirror 74 which reflects light that has passed through the light smoothing unit 75 towards a light shining mirror 84, a light source-side lens group 62 which causes light reflected on the second reflection mirror 74 to converge on the display device 50, the light shining mirror 84 which shines light that has passed through the light source-side lens group 62 at a predetermined angle towards the display device 50 from a position lying obliquely forwards and downwards of the display device 50, and the display device 50 which is made up of a DMD (Digital Micromirror Device).

This DMD reflects light that has entered from the position lying obliquely forwards and downwards of the device into an "on state" light beam which is reflected towards a front direction and an "off state" light beam which is reflected towards an obliquely upward direction to thereby display an image by switching tilting directions of a plurality of micromirrors. Specifically, light incident on micromirrors which are tilted in one tilting direction is reflected to the front direction by the micromirrors so as to be made into the "on state" light beam and light incident on micromirrors which are tilted in the other tilting direction is reflected obliquely so as to be made into the "off state" light beam, whereby an image is generated to be displayed by the "on state" light beam which is reflected to the front direction.

In addition, the projection-side block 80 has a lens group of a projection-side optical system 90 which projects the light reflected at the display device 50 to form an image on to a screen, and the projection-side optical system 90 is made up of a fixed lens group 93 and a movable lens group 97 into a variable focus lens having a zooming function, whereby the movable lens group 97 is moved by a lens motor for zooming adjustment or focusing adjustment.

A cooling mechanism of this projector 1 is configured such that air lying in the periphery of the inlet port 111 of the blower 110 is let in so as to allow outside air to be let into the inlet side space from the air inlet holes 8 provided in the right side plate 4, the left side plate 5 and the back plate which constitutes the side plates of the projector housing, the outside air so let in firstly cools the various members which are disposed in the inlet side space, the cooling air is then let out from the outlet port 113 of the blower 110 into the light source storing section 121 so as to cool the various members within the light source storing section 121, and the air that has heated to a high temperature as a result of cooling the various members is finally let out from the air outlet holes 7 in the front plate 3 to the outside.

Thus, in the cooling mechanism of the projector 1, fresh outside air is let into the interior of the projector 1 from the outside of the projector 1 through the air inlet holes 8 in the side plates so as to cool the various members in the inlet side space, the cooling air discharged from the blower 110 which functions as the cooling fan is blown out from the air inlet port 123 of the light source compartment 120 into the light source storing section 121 so as to cool the light source unit 61 and the like which are stored in the light source storing section 21 and are heated to high temperatures, and the air that has cooled the various member in the light source storing section 121 is finally discharged from the air outlet port 125 of the light source storing section 121 to the outside of the projector 1 via the outlet flow path 141.

In addition, the pinwheel member 151 is provided in the air outlet port 125 of the light source compartment 120 as the light shielding member, and since the vane portions 155 of the pinwheel member 151 close the outlet flow path 141, light from the light source unit 61 stored in the light source storing section 121 is cut off by the vane portions 155 so as to prevent the leakage of light to the outside from the air outlet port 125 and the air outlet holes 7. Additionally, since the vane portions 155 of the pinwheel member 151 are supported rotatably on the rotational shaft 153, the ventilation resistance against cooling air is reduced through rotation of the pinwheel member 151 so as to facilitate the passage of cooling air from the blower 110 into the light source storing section 121, thereby making it possible for a large amount of cooling air to be let into the light source storing section 121.

Consequently, the projector 1 can be made into a projector which is free from light leakage from the air outlet holes 7, and which has a high cooling efficiency on the periphery of the light source unit 61 and from which only low noise is produced.

In addition, as another embodiment, a plurality of pinwheel members 151 may be provided.

Figure 4:
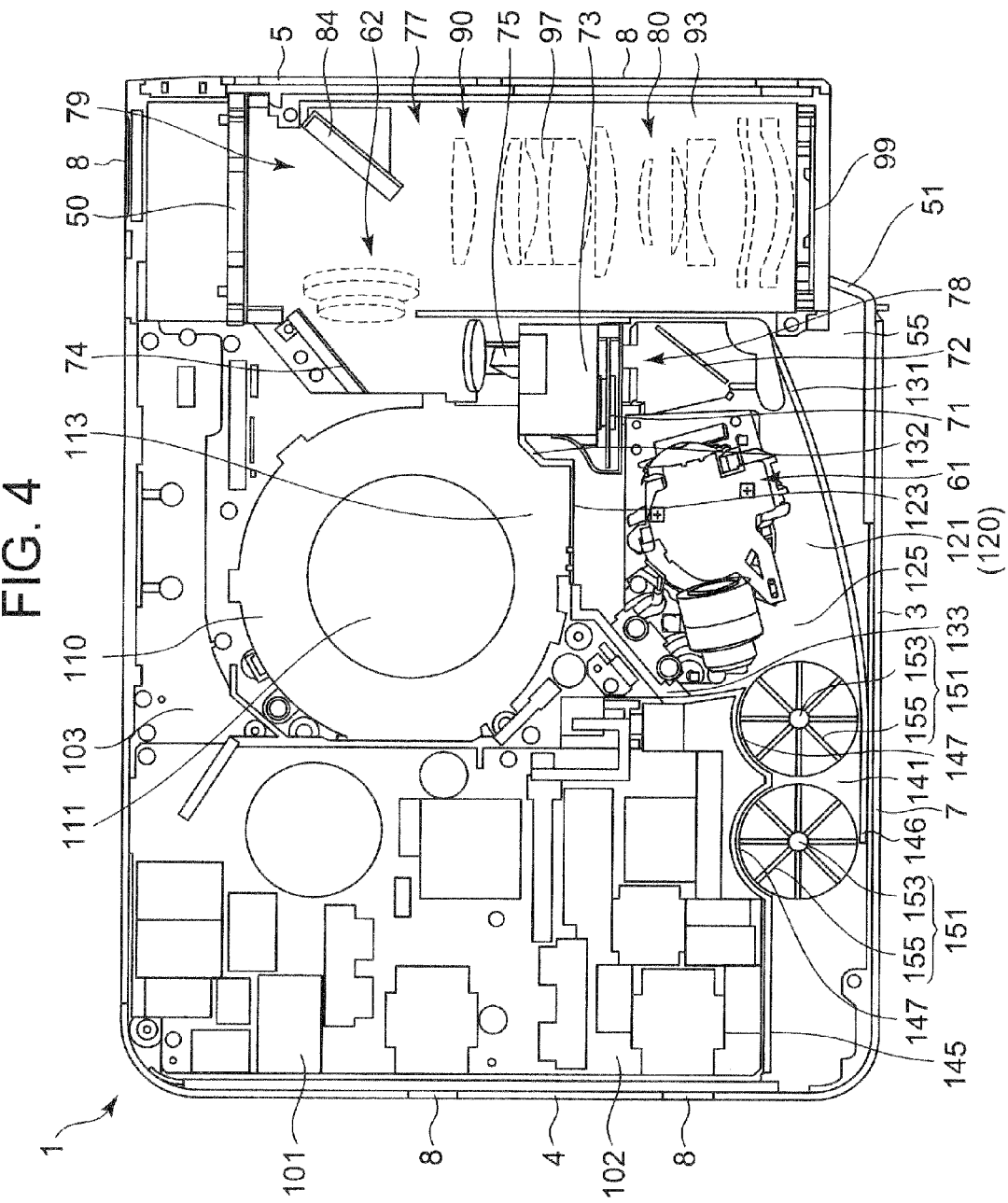
FIG. 4 is a plan view of a modified example of a projector according to the invention with a top plate thereof removed.

As a case where a plurality of pinwheel members 151 are provided, when pinwheel members 151 are disposed along an outlet flow path 141, as is shown in FIG. 4, two curved portions 147 are formed in a flow path partitioning wall 145 so that two pinwheel members 151 are disposed along the flow path partitioning wall 145. A first partitioning wall 131 is extended from an air outlet port 125 towards the outlet flow path 141 so as to provide a second flow path partitioning wall 146.

This second flow path partitioning wall 146 is disposed to face the flow path partitioning wall 145 which continues from a third partitioning wall 133 and is provided in such a manner as to be positioned very near to distal ends of vane portions 155 of the two pinwheel members 151 which are provided along the flow path partitioning wail 145.

Consequently, in the event that a light source unit 61 is out of line relative to an extension of a line which connects rotational shafts 153 of the two pinwheel members 151, even though a slight amount of light leaks from a gap generated between the distal ends of the vane portions 155 of the pinwheel member 151 which lies close to a light source storing section 121 and the second flow path partitioning wall 146 due to the rotation of the pinwheel member 151 in question, the light so leaking is cut off by the pinwheel member 151 which lies on the side of the air outlet holes 7.

In addition, where the light source unit 61 is positioned on the extension of the line which connects the rotational shafts 153 of the two pinwheel members 151, a member having a recessed portion which matches a rotating circular arc produced by the distal ends of the vane portions 155 of the pinwheel member 151 is disposed inside of the second flow path partitioning wall 146, so that even though the pinwheel members 151 rotate, no rectilinear gap is generated between the second flow path partitioning wall 146 and the distal ends of the vane portions 155.

Additionally, in disposing a plurality of pinwheel members 151 are disposed in the outlet flow path 141, there may be a case where two pinwheel members 151 are disposed in such a manner that the pinwheel members 151 face each other in a meshing or overlapping manner.

In this embodiment, as is shown in FIG. 5, a curved portion 147 is formed in a second flow path partitioning wall 146 which continues to an air outlet port 125 side end portion of a first partitioning wall 131 so that a pinwheel member 151 which has a rotational shaft 153 is disposed close to the second flow path partitioning wall 146, and distal ends of vane portions 155 of this pinwheel member 151 are made to overlap distal ends of vane portions 155 of a pinwheel member 151 which has a rotational shaft 153 positioned near a flow path partitioning wall 145 which continues from a third partitioning wall 133, whereby even though both the pinwheel members 151 rotate, no light leaks out to an outlet flow path 141 from a light source storing section 121.

Thus, according to the embodiments that have been described heretofore, the light source compartment 120 is provided in which the light source unit 61 is disposed in the interior of the light source storing section 121, the circumference of the light source storing section 121 is surrounded by the partitioning walls 131, 132, 133, and the pinwheel member 151 having the rotatable vane portions 155 is disposed in the air outlet port 125, so that light from the light source unit 61 is cut off so as to allow no light leakage from the light source storing section 121 while preventing the increase in ventilation resistance of cooling air.

In addition, the number of pinwheel members 151 which are disposed in the outlet flow path 141 in the vicinity of the air outlet port 125 as the light shielding members is not limited to one, but there may be a case where a plurality of pinwheel members 151 are disposed, and furthermore, the air outlet port 125 through which the cooling air is let out from the light source storing section 121 is not limited to the one location, but a plurality of air outlet ports 125 may be provided with a pinwheel member 151 disposed in each of the plurality of air outlet ports 125.

Moreover, although the pinwheel 151 shown in the drawings has the rotational shaft 153 which is directed in the normal direction, there may be a case where the rotational shaft 153 is directed in a horizontal direction so that the pinwheel member 151 is made to rotate vertically, a member which forms a curved portion is disposed on an inside of the top plate 2 or a bottom plate of the projector 1 so as to allow the pinwheel member 151 to rotate smoothly, and a member having a recessed portion which matches a moving locus of the distal ends of the vane portions 155 of the pinwheel member 151 is disposed in a position which faces the curved portion so as to prevent the leakage of light from the light source unit 61.

Furthermore, a motor for rotating the pinwheel members 151 may be provided additionally in such a manner that a rotational shaft of the motor is coupled to the rotational shafts 153 of the pinwheel members 151, so that the vane portions 155 are rotated by the motor so as to promote the discharge of air from the light source storing section 121.

In addition, the invention is not limited to the embodiments and modified example of the invention, and hence, the invention can be modified and/or improved freely without departing from the spirit and scope of the invention.

What is claimed is:

1. A light source compartment storing a light source unit, the light source compartment comprising:
    a light source storing section which is defined by partitioning walls which surround the light source unit;
    an air inlet port which is provided in the partitioning walls for causing air discharged from a cooling fan to flow into the light source storing section; and
    at least one rotatable light shielding member which includes a rotational shaft and a plurality of vane portions on the rotational shaft, and which is provided in an air outlet port which is defined in the partitioning walls to let out the air;
    wherein the air outlet port has a flow path partitioning wall which defines an outlet flow path for guiding air discharged from the light source storing section;
    wherein the rotational shaft of the light shielding member is disposed in a vicinity of the flow path partitioning wall so that the vane portions close the outlet flow path;

wherein a curved portion is formed in the flow path partitioning wall so as to permit rotational passage of the vane portions; and wherein the rotational shaft is disposed in a vertical direction with respect to a flow of air discharged from the outlet flow path.

2. A light source compartment storing a light source unit as set forth in claim 1, wherein the at least one rotatable light shielding member is a plurality of light shielding members which are provided in the outlet flow path.

3. A light source compartment storing a light source unit as set forth in claim 2, wherein the plurality of light shielding members are disposed along the outlet flow path.

4. A light source compartment storing a light source unit as set forth in claim 2, wherein rotational shafts of the plurality of light shielding members are positioned so that distal ends of vane portions on the respective rotational shafts overlap each other.

5. A light source compartment storing a light source unit as set forth in claim 1, wherein the rotational shaft of the light shielding member is coupled to a shaft of a motor.

6. A light source compartment storing a light source unit as set forth in claim 2, wherein each rotational shaft of the plurality of light shielding members is coupled to a shaft of a motor.

7. A light source compartment storing a light source unit as set forth in claim 1, wherein the light shielding member is rotated by discharged air.

8. A light source compartment storing a light source unit as set forth in claim 2, wherein the light shielding members are rotated by discharged air.

9. A projector comprising:
a housing;
a light source unit;
a light source-side optical system;
a display device;
a projection-side optical system;
a cooling fan; and
a projector control unit;
wherein the light source unit, the light source-side optical system, the display device, the projection-side optical system, the cooling fan, and the projector control unit are housed in the housing;

wherein the projector comprises air inlet holes and air outlet holes provided in the housing;

wherein at least one light shielding member which includes a rotational shaft and a plurality of vane portions on the rotational shaft is provided in an outlet flow path of the cooling fan which is connected to the air outlet holes;

wherein the projector comprises a flow path partitioning wall which defines the outlet flow path;

wherein the rotational shaft of the light shielding member is disposed in a vicinity of the flow path partitioning wall so that the vane portions close the outlet flow path;

wherein a curved portion is formed in the flow path partitioning wall so as to permit rotational passage of the vane portions; and wherein the rotational shaft is disposed in a vertical direction with respect to a flow of air discharged from the outlet flow path.

10. A projector as set forth in claim 9, wherein the at least one light shielding member is a plurality of light shielding members which are disposed along the outlet flow path.

11. A projector as set forth in claim 9, wherein the at least one light shielding member is a plurality of light shielding members, and rotational shafts of the plurality of light shielding members are positioned so that distal ends of vane portions on the respective rotational shafts overlap each other.

12. A projector as set forth in claim 9, wherein the rotational shaft of the light shielding member is coupled to a shaft of a motor.

13. A projector as set forth in claim 10, wherein each rotational shaft of the plurality of light shielding member members is coupled to a shaft of a motor.

14. A projector as set forth in claim 9, wherein the light shielding member is rotated by discharged air from the cooling fan.

15. A projector as set forth in claim 10, wherein the light shielding members are rotated by discharged air from the cooling fan.

* * * * *